(No Model.) 3 Sheets—Sheet 1.
DE W. C. SANFORD.
REFRIGERATOR AND REFRIGERATING ROOM.
No. 244,770. Patented July 26, 1881.
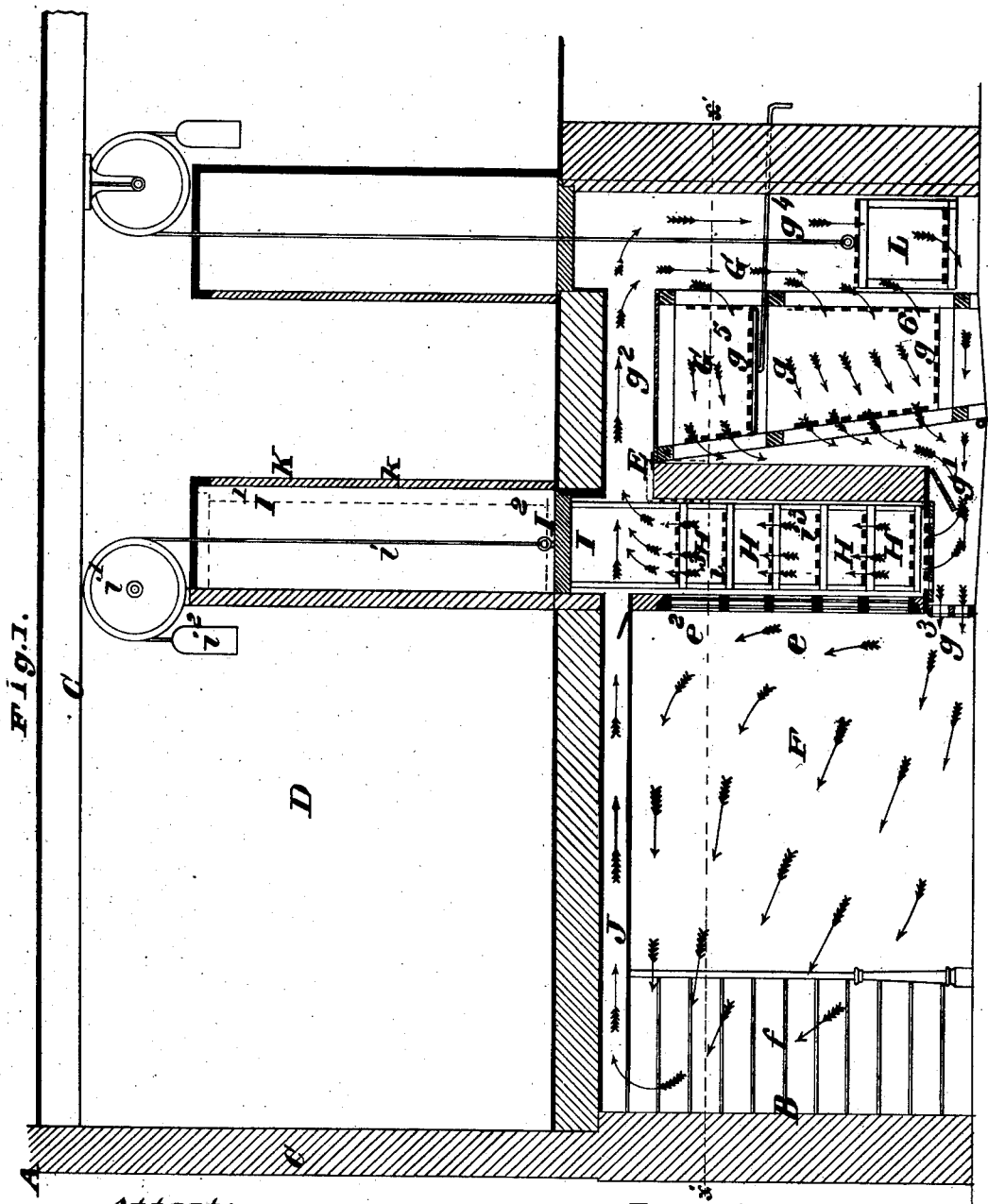

(No Model.)  DE W. C. SANFORD.  3 Sheets—Sheet 2.
REFRIGERATOR AND REFRIGERATING ROOM.
No. 244,770.  Patented July 26, 1881.
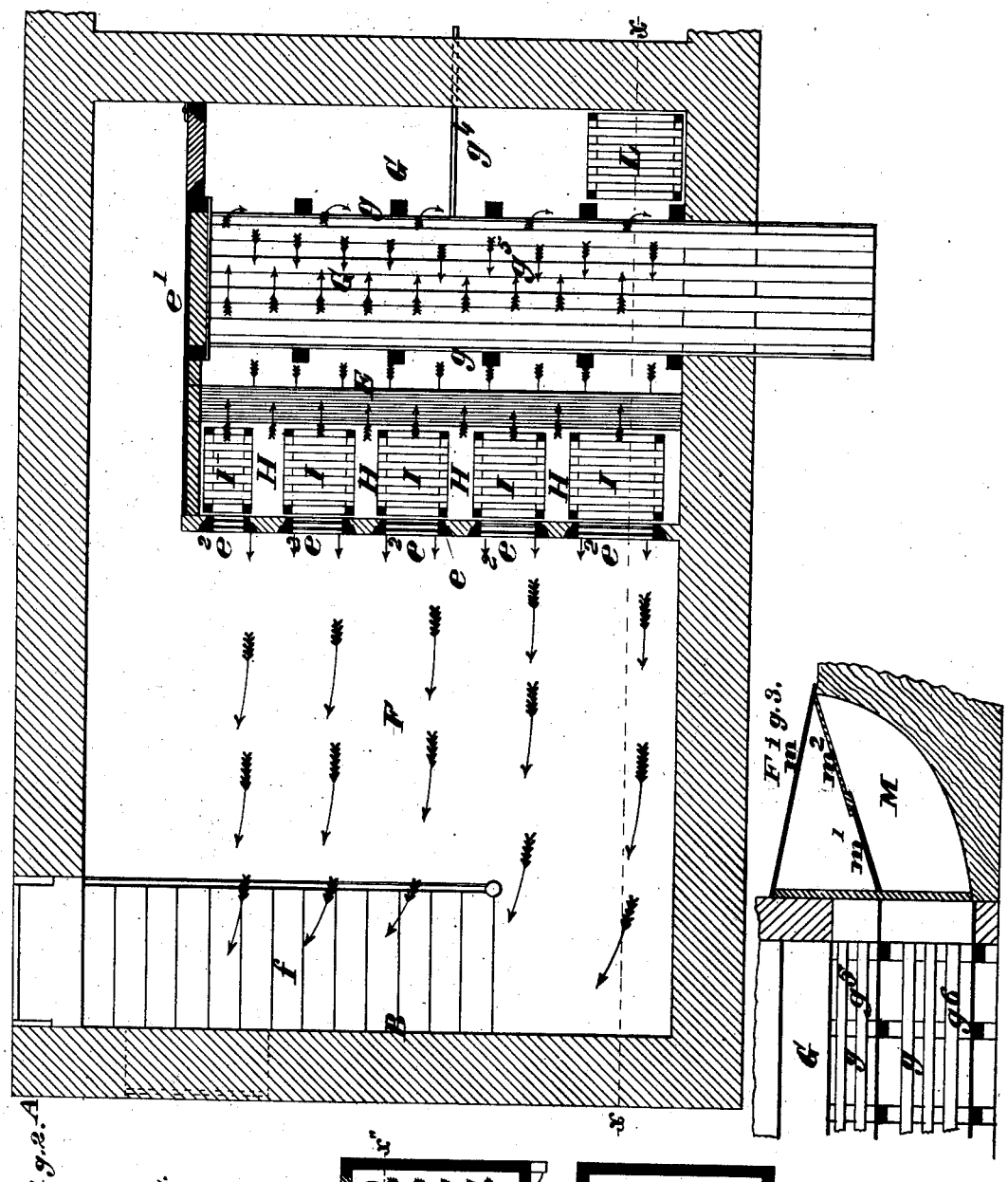
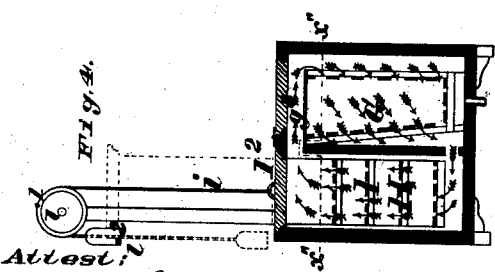
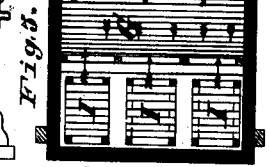
Attest:
Charles Pickles
Solon N. Dapp.
Inventor:
DeWitt C. Sanford.
by C. D. Moody, atty.

(No Model.) 3 Sheets—Sheet 3.
DE W. C. SANFORD.
REFRIGERATOR AND REFRIGERATING ROOM.
No. 244,770. Patented July 26, 1881.
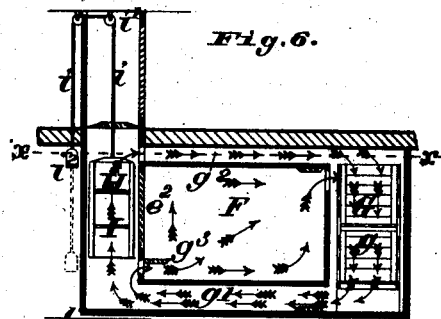
Fig.6.
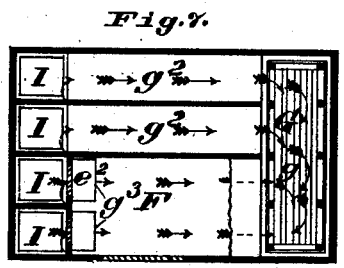
Fig.7.
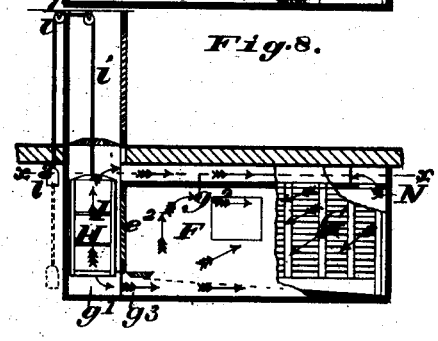
Fig.8.
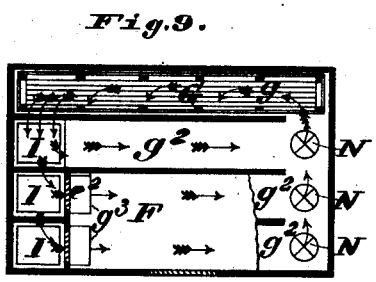
Fig.9.
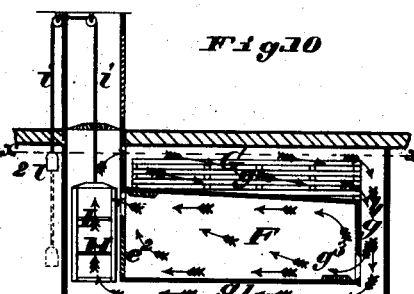
Fig.10.
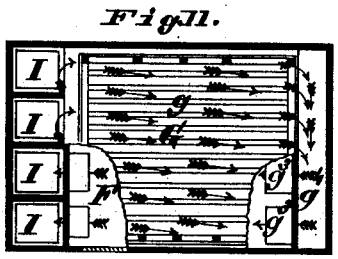
Fig.11.
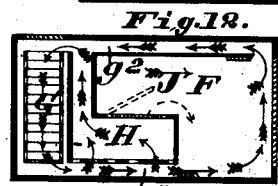
Fig.12.
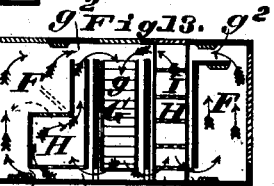
Fig.13.
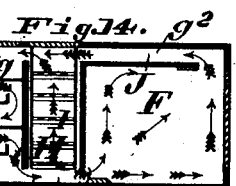
Fig.14.
Fig.15. Fig.16.
Fig.17. Fig.18.
Attest:
Charles Pickles
Solon U. Capp.
Inventor:
DeWitt C. Sanford
by C. P. Mooky
atty.

UNITED STATES PATENT OFFICE.

DE WITT C. SANFORD, OF ST. LOUIS, MISSOURI.

REFRIGERATOR AND REFRIGERATING-ROOM.

SPECIFICATION forming part of Letters Patent No. 244,770, dated July 26, 1881.

Application filed March 12, 1881. (No model.)

*To all whom it may concern:*

Be it known that I, DE WITT C. SANFORD, of St. Louis, Missouri, have made a new and useful Improvement in Refrigerators and Refrigerating-Rooms, of which the following is a full, clear, and exact description, reference being had to the annexed drawings, making part of this specification, in which—

Figure 1 is a longitudinal vertical section, showing the application of the improvement to a house, two stories of which are shown, and which in this case may be considered the basement or cellar below, and the kitchen, pantry, or dining-room above, the section being taken on the line $x\ x$ of Fig. 2; Fig. 2, a horizontal section taken on the line $x'\ x'$ of Fig. 1; Fig. 3, a detail, being a vertical longitudinal section taken through the outer end of the ice-receiving chute; Fig. 4, a vertical section, showing a portion of the improvement as applied to a portable refrigerator, access to the refrigerating-chamber being through the top of the chest, and the shelf or shelves being made to be elevated and lowered like a dumb-waiter; Fig. 5, a horizontal section taken on the line $x''\ x''$ of Fig. 4; and Figs. 6 to 18, inclusive, sectional views, showing different modes of applying the improvement in question.

The same letters denote the same parts.

The present improvement is applicable to private residences, restaurants, hotels, groceries, meat-shops, markets, vessels, and many other constructions and places wherein it is desirable or necessary to preserve articles of human food in a healthful condition.

Refrigerators, generally considered, may, as to form, be divided into two classes, the "chest" form, consisting of those which open only at the top, and the "cupboard," "closet," or "upright" form, embracing those which open at their front or side. The advantage possessed by the chest form over the cupboard or upright form is, that when the chest is opened or left open the cold air contained in it, being heavier than the external air, is retained in the chest, while in the upright or cupboard form, when the door in front or at the side is opened or left open the cold air contained in it naturally flows out and is lost, its place being taken by the warmer external air, whereby the consumption of the ice is increased. The advantage possessed by the cupboard or upright form over the chest form is the greater convenience of access to the interior of the former, access to the shelves in a chest being generally quite inconvenient.

One of the aims of the present improvement is to provide a refrigerator which combines the advantages, without the disadvantages, of both of the forms of refrigerator above described. I accomplish this, in cases where it is desirable to have the opening at the top of the refrigerator, by means of an arrangement and construction by which that part of the interior consisting of shelves or other supports for the articles being refrigerated, together with the articles, are easily lowered bodily into, and elevated bodily from, the interior of the refrigerator, and without the necessity of first removing separately the upper fixtures and articles in order to obtain access to the lower ones, the operation being analogous to that of a dumb-waiter; and, if desired, the shelves or supports may be divided vertically into sections each of which can be operated independently of each other.

In cases where it is desirable to have access to the interior of the refrigerator through an opening in its front or side, the object is accomplished by having the refrigerator open into an anteroom, which is in itself a refrigerating-room or large chest, the walls of which are constructed of non-heat-conducting material, the room or chest being refrigerated by a current of cold air supplied from the same air-cooling chamber that supplies the refrigerator proper above referred to, (or another air-cooling chamber,) as well as by the leakage of cold air from the openings of the refrigerator proper. The room or chest is intended to be kept at a temperature as cold as desired, but not as cold as the refrigerator proper, and by surrounding, or partially surrounding, the refrigerator proper it acts as an outer casing thereto. It also serves as a cold larder for the preservation of articles that do not require a temperature as low as is intended to be maintained in the refrigerator proper. This refrigerating anteroom or cold larder containing the smaller refrigerator or refrigerators, or abutting upon or adjoining the same, may be built on any floor, or be made part of any story of a house, and the shelves or supports for the articles of food within any or all of the small refrigerators be arranged to be elevated to the story above and returned at will.

The small refrigerators or refrigerated dumb-waiters may be constructed so that access may be obtained to their interior, either by elevating them to an upper story or through openings in the sides or fronts of their cases opening into the refrigerated anteroom. They may be of any size and number, so that the articles contained in them may be classified and arranged as desired. Their shelves are perforated or formed of slats, so as to admit of a free passage of air through them, and the various parts of the refrigerators are constructed so that there will be a current of cold air ascending through them when in place. Each dumb-waiter may be contained in a separate case, with a door or doors opening into the anteroom or cold larder. There may be cases above to receive and inclose from the outer warmer air the dumb-waiters when elevated as described.

It is advisable that the anteroom be constructed so as to be entered only from above, as by stairways from the top, in order to prevent the loss of cold air.

Referring to Figs. 1 and 2 of the drawings, A represents a building or a portion of a building embodying the main features of the improvement.

B represents a basement or cellar, and C an upper story, containing a room, D, which may be a kitchen, dining-room, or pantry.

E represents the refrigerator proper, and F the refrigerated anteroom or large chest, which may, if desired, extend all around the refrigerator E; but, as shown, the latter is arranged in one corner of the basement B, and the room F abuts against the two sides $e$ $e'$ only of the refrigerator.

G represents the air-cooling apartment of the refrigerator, and contains, when ice is the cooling agent used, an ice-crib, $g$, for holding the ice. The air coming in contact with the ice is thereby cooled and descends into the flue $g'$, and thence ascends into the refrigerating-apartment H of the refrigerator, passing upward through the apartment H, and through and around the waiter I therein, and thence through the flue $g^2$ into the apartment G and crib $g$ again, and so on, around and round. A portion of the air also passes, or may pass, through the opening $g^3$ into the anteroom F, and thence, together with such air as escapes from the apartment H, into a flue, J, through which this last-described portion of the air is conducted back, through the upper part of the apartment H, into the apartment G, the circulations being indicated by the arrows.

The waiter I is suspended by the cord $i$, which passes over the pulley $i'$, and is provided with a counter-balance, $i^2$. By means of this the waiter can be readily elevated into the upper story or room, C, and, if desired, into a casing, K, which is arranged in the room C at the proper point for receiving the waiter, being made slightly larger that the waiter, and being provided with a door at $k$, by opening which the interior of the waiter can be reached. The position of the waiter when elevated is indicated by the dotted lines I', Fig. 1. When the waiter is let down its top $I^2$ serves to close the passage between the basement B and room C. In practice the waiter is elevated into the upper room or space, C, and the articles to be refrigerated there put into it. The waiter is then lowered into the refrigerator into the position shown in Fig. 1. The air from the chamber G then circulates through it, passing upward through the shelves $i^3$ $i^3$, and cooling the articles thereupon. There may be doors $e^2$ $e^2$ in the wall $e$ of the refrigerator to afford access to the waiter from the anteroom; but when it is desired to reach the articles in the refrigerator from above the waiter is elevated, as described, into the upper story of the building. The anteroom or larder F is preferably reached by the stairway $f$.

L represents an elevator by which ice can be readily lifted to the upper story, the chamber G having a passage, $g^4$, through which the operator can pass to load the elevator L. The ice is conveniently placed in the crib $g$ by means of a chute, M, the outer end of which extends to any desirable point for receiving the ice—say to beneath a sidewalk, when the structure containing the improvement is alongside the street, as shown in Fig. 3. By raising the lid, door, or hatchway $m$, the blocks of ice can be dropped into the chute (which is inclined) and discharged thence into the crib. The latter may be divided into stories $g^5$ $g^6$, and as it is desirable to keep the ice stored as high as possible in the crib the chute, by means of a horizontal partition, $m'$, may be divided so that the ice can be delivered to either story of the crib. When the upper story, $g^5$, is being filled the removable portion $m^2$ of the partition $m'$ is let down, as shown in Fig. 3. When the lower story is being filled the part $m^2$ is raised.

In Figs. 4 and 5 the dumb-waiter feature of the improvement is applied to a portable refrigerator, the anteroom not being shown.

In Fig. 6 the air-cooling chamber is arranged at one end or side of the refrigerating or anteroom and the refrigerator proper at the opposite end or side. The movement of the air-currents in that case is indicated by the arrows.

Fig. 7 is a horizontal section taken on the line $x\ x$ of Fig. 6. As there indicated several dumb-waiters and one or more anterooms may be arranged side by side. In the lower half of this figure the roof of the anteroom is broken away.

In Fig. 8, which is a vertical longitudinal section, the air-cooling chamber is shown at one side of the anteroom or rooms and dumb waiter or waiters.

Fig. 9 is a horizontal section taken on the line $x\ x$ of Fig. 8. It shows a series of refrigerators proper. Portions of the ceiling of the anteroom are broken away in this figure, as well as portions of the vertical partitions in Fig. 8. In Fig. 9 registers N are used to control the passage of the air.

Fig. 10 is a vertical longitudinal section showing the air-cooling chamber above the anteroom, the latter being between the descending cold-air flue and the refrigerator proper.

Fig. 11 is a horizontal section, taken on the line $x\ x$ of Fig. 10, portions of the crib and of the roof of the anteroom being broken away.

Fig. 12 is a vertical longitudinal section, showing a refrigerator of the chest form within the anteroom.

Fig. 13 is a vertical longitudinal section, showing anterooms at both ends of the construction and the air-cooling chamber in the middle. It also shows a chest in one anteroom and a vertical series of shelves or a dumb-waiter beside the other anteroom.

Fig. 14 shows the air-cooling chamber at one end and the anteroom at the opposite end, and the dumb-waiter or refrigerator proper between. Shelves are used in the air-cooling chamber in place of a crib.

Figs. 15 and 17 are vertical longitudinal sections, showing further modifications in the relative arrangements of the air-cooling chamber and dumb-waiters, and the necessary connecting air-flues.

Fig. 16 is a horizontal section, taken on the line $x\ x$ of Fig. 15, and Fig. 18 a horizontal section taken on the line $x\ x$ of Fig. 17.

The constructions shown in the four last-named figures are intended more especially for portable refrigerators.

The arrows in the various figures indicate the directions of the air-currents therein.

In Figs. 13, 14, 15, 16, 17, and 18 no means is shown for elevating the interior of the refrigerators, but it is understood as existing.

Any ventilation desired may be provided for in the usual modes.

In the above-described constructions there may be a single air-cooling chamber common to all of the connected refrigerators and anteroom, or each of the refrigerators and the anteroom may have a separate air-cooling chamber.

I claim—

1. A refrigerator opening on top and having an air-cooling chamber and a refrigerating-apartment, a current of air flowing from the air-cooling chamber through the refrigerating-apartment and returning to the air-cooling chamber, and fixtures for holding the articles being refrigerated, which can be lowered bodily into and raised out of the said refrigerating-apartment at will.

2. One or more refrigerators within, or which open into, a refrigerated apartment, said refrigerators and apartment being constructed and arranged for the circulation of a current of cold air through each of them independently of the others, and said cold air being supplied from an air-cooling chamber common to all of said refrigerators and apartment, or from separate air-cooling chambers.

3. The combination of the air-cooling chamber G, apartment H, and waiter I, substantially as described.

4. The combination of the lower room, B, upper room, D, refrigerator E, and waiter I, substantially as described.

5. The combination of the rooms B and D, refrigerator E, waiter I, and casing K, substantially as described.

6. The combination of the refrigerator E, anteroom F, and opening $g^3$, and flue J, substantially as described.

7. The combination of the anteroom F and the refrigerator E, said refrigerator opening into said room at $g^3$, substantially as described.

8. The combination of the refrigerator E, anteroom F, waiter I, and room D, substantially as described.

9. The combination of the apartment H, having the doors $e^2$, and the anteroom F, substantially as described.

10. The combination of the dumb-waiter I, having the perforated shelves $i^3$, and the refrigerator G, substantially as described.

D. W. C. SANFORD.

Witnesses:
CHAS. D. MOODY,
CHARLES PICKLES.